United States Patent [19]

Capaul

[11] 4,040,213
[45] Aug. 9, 1977

[54] UNITARY STRUCTURAL PANEL FOR CEILING AND WALL INSTALLATIONS

[76] Inventor: Raymond W. Capaul, Rte. 3, Wildwood Drive, Aurora, Ill. 60544

[21] Appl. No.: 606,963

[22] Filed: Aug. 22, 1975

[51] Int. Cl.² .......................... E04B 1/86; E04B 1/94
[52] U.S. Cl. ..................................... 52/145; 52/316; 52/622; 181/33 G; 428/255; 428/317
[58] Field of Search .................. 52/144, 145, 622, 316, 52/291; 156/42, 71; 181/33 G, 33 GA; 428/317, 139, 140, 256, 539, 255

[56] References Cited

U.S. PATENT DOCUMENTS

| | | | |
|---|---|---|---|
| 1,751,249 | 3/1930 | Rosenblatt | 52/145 X |
| 2,071,921 | 12/1937 | Dickson | 428/139 |
| 2,355,608 | 8/1944 | Stieger | 52/145 |
| 2,726,977 | 12/1955 | See et al. | 52/145 X |
| 2,968,219 | 7/1961 | Salla | 52/316 X |
| 2,999,041 | 9/1961 | Lappala | 181/33 G |
| 3,002,868 | 10/1961 | Boivin | 181/33 G |
| 3,007,539 | 11/1961 | Brewer et al. | 52/144 |
| 3,013,626 | 12/1961 | Brown et al. | 52/316 X |
| 3,043,733 | 7/1962 | Harmon et al. | 181/33 GA |
| 3,300,927 | 1/1967 | Bettoli | 52/622 X |
| 3,504,463 | 4/1970 | Akerson | 52/145 |
| 3,513,613 | 5/1970 | Jones et al. | 181/33 GA |
| 3,712,846 | 1/1973 | Daniels et al. | 181/33 G X |

FOREIGN PATENT DOCUMENTS

| | | | |
|---|---|---|---|
| 45-38160 | 2/1970 | Japan | 428/256 |

Primary Examiner—Leslie Braun
Attorney, Agent, or Firm—Wallenstein, Spangenberg, Hattis & Strampel

[57] ABSTRACT

A unitary structural panel for ceiling and wall installations has a dimensional stability and structural strength to be edge supported as a unit without sagging or warping, a high impact resistance, a good fire rating and easy washability. It comprises a relatively thick fabricated panel which of itself may be subject to sagging or warping or impact damage or fire damage or soil damage, and a relatively thin and flexible laminated facing for the fabricated panel. The thin and flexible laminated facing includes a metallic film, a glass fiber scrim and a synthetic plastic film adhesively secured together with the scrim between and bonded to the metallic film and the synthetic plastic film and with the metallic film bonded to the synthetic plastic film within the openings in the scrim. The laminated facing is adhesively secured to the fabricated panel with the metallic film thereof bonded to a face of the fabricated panel and with the synthetic plastic film thereof exposed.

38 Claims, 5 Drawing Figures

UNITARY STRUCTURAL PANEL FOR CEILING AND WALL INSTALLATIONS

This invention is directed to a unitary structural panel for ceiling and wall installations having large area dimensions, such as, 2 × 2 feet, 2 × 4 × 4 or larger.

Structural panels have been conventionally proposed and utilized in the past, such as, panels formed of gypsum boards, glass fiber reinforced gypsum boards, wet felted mineral boards, mineral fiber boards including glass fiber boards, rock or slag wood boards, and the like, but they have not proven to be uniformly acceptable because of major deficiencies therein. For example, they may be subject to sagging or warping, especially when made with large area dimensions. Mineral fiber boards themselves, including glass fiber boards and rock or slag wool boards do not have sufficient rigidity to be edge supported when constructed with large area dimensions. Wet felted mineral boards and glass fiber reinforced gypsum boards also lack sufficient rigidity, especially when they become moist or wet, and they will also sag and warp. These conventional boards have a low impact resistance and are readily subject to impact damage. Many of them also have poor fire ratings and flammability characteristics including flame spread, fuel contribution and smoke development. These conventional boards are also porous and breathe and have rough surfaces so as to be readily subject to soil and damage and difficult to clean.

Various improvements have been suggested and used in the past to obviate some of the foregoing deficiencies present in such conventional structural panels. For example, applicant has developed and produced acoustical ceiling and wall panels utilizing medium density glass fiber boards which are embossed vinyl film faced and also mineral fiber boards which are glass fabric faced. These acoustical panels have minimized some of the aforementioned deficiencies including sagging and warping and have enjoyed considerable commercial success. Examples of such acoustical panels are disclosed in Capaul U.S. Pat. No. 3,183,996.

Metal faced structural panels have also been proposed in the past as disclosed in Akerson, U.S. Pat. Nos. 3,509,671, 3,504,462 and 3,504,463 wherein aluminum foils are adhered to wet felted mineral boards and wherein the aluminum foils are perforated into the boards for acoustical purposes. The construction of U.S. Pat. No. 3,509,671 was not successful due to warping. To minimize the warping, U.S. Pat. No. 3,504,462 proposed adhering an aluminum foil to the rear of the board. U.S. Pat. No. 3,504,643 proposed to emboss the aluminum foil on the face of the panel to reduce the warping. Applicant has developed and produced metal faced structural panels utilizing embossed aluminum foils adhered to glass fiber reinforced gypsum boards and also to wet felted mineral boards wherein the aluminum foil is provided with a vinyl coating for easy washability. These panels, in some instances, were perforated for acoustical purposes. These vinyl coated aluminum faced structural panels substantially reduced sagging and warping, had a good fire rating and were easily washable due to the vinyl coating. However, they were easily washable due to the vinyl coating. However, they were somewhat susceptible to impact damage.

The principal object of this invention is to provide an improved unitary structural panel for ceiling and wall installations which has large area dimensions, dimensional stability and structural strength to be edge supported as a unit without sagging or warping (substantially better than the sagging and warping characteristics of the aforementioned metal faced structural panels), high impact resistance (also substantially greater than the impact resistance characteristics of the aforementioned metal faced structural panels), good fire rating and flammability characteristics including low flame spread, fuel contribution and smoke development, and easy washability, all of which have not been heretofore collectively obtained in a structural panel.

Briefly, in accordance with this invention, the unitary structural panel comprises a relatively thick fabricated panel or board of large area dimension which may be conventional in the industry, such as, glass fiber reinforced gypsum boards, wet felted mineral boards, mineral fiber boards including glass fiber boards and rock or slag wool boards, or the like, which of themselves may be subject to sagging or warping, or impact damage or fire damage or soil damage, and a relatively thin and flexible laminated facing for the fabricated panel or board.

The thin and flexible laminated facing includes a metallic film, a glass fiber scrim and a synthetic plastic film adhesively secured together with the scrim between and bonded to the metallic film and the synthetic plastic film and with the metallic film bonded to the synthetic plastic film within the openings in the scrim. The laminated facing is adhesively secured to the fabricated panel with the metallic film thereof bonded to a face of the fabricated panel and with the synthetic plastic film thereof exposed.

The glass fiber scrim is arranged in substantially a flat plane and the metallic film and synthetic plastic film, where they are bonded together within the openings of the glass fiber scrim, deviate from their respective planes to form protuberances and depressions therein. The scrim and the protuberances and depressions in the exposed synthetic plastic film provide the laminated facing with a textured and pleasingly ornamental appearance. The scrim and the protuberances and depressions in the metallic film provide the laminated facing with an uneven surface where it is bonded to the fabricated panel.

The glass fiber scrim, which is in substantially a flat plane, has greater strength than the metallic film, the synthetic plastic film and the fabricated panel and it is basically instrumental in controlling and holding the dimensions of the metallic film, the synthetic plastic film and the fabricated panel to provide the unitary structural strength to be edge supported as a unit with substantially no sagging or warping. The relatively thin and flexible laminated facing, including the metallic film, the glass fiber scrim and the synthetic plastic film, in the combination thereof, provides greater dimensional stability and structural strength to the unitary structural panel than are provided separately by the vinyl film facings, glass fabric facings, aluminum foil facings and the like of the aforementioned prior structural panels. While the vinyl film facings, the glass fabric facings and the metallic foil facings of the aforementioned prior structural panels afford some degree of impact resistance, the relatively thin and flexible laminated facing of the invention provides a considerably greater amount of impact resistance and this is basically afforded by the incorporation of the glass fiber scrim in the laminated facing also including the metallic film and the synthetic plastic film. These definite improvements afforded by the laminated facing combination of this invention amount to more than the effects of the aforementioned prior constructions and more than the cumulative effects of the component elements thereof. The thin and flexible laminated facing of this invention has a tensile strength (ASTM D-751) of 75/50 lbs. per inch, a tear strength (ASTM D-689) of 6.0/4.5 lbs. per inch and a puncture resistance (ASTM D-781) of 35.

Since the synthetic plastic film of the laminated facing of the fabricated panel is exposed, the unitary structural panel of the invention may be easily washed and cleaned, more so than the prior structural panels having glass fabric facings and aluminum foil facings. Also, the laminated facing of this invention is substantially impervious so that it cannot breathe and allow dirt laden air to penetrate and soil the same. It has a permeability (ASTM E-96) of less than 0.02 perms.

The unitary structural panels having the thin and flexible laminated facing of this invention have good fire ratings and flammability characteristics which are within accepted standards (ASTM E-84) including flame spread of 25, fuel contribution of 0 and somke development of 30. The exposed synthetic plastic film of the laminated facing has a pigment incorporated therein, such as, a white titanium based pigment, and the laminated facing has high light stability passing 450 hours in a Fadeometer test, and has a light reflectivity (ASTM C-523) class a of 0.75 or greater for the nonperforated laminated facing and class b of 0.70 to 0.74 for the perforated laminated facing. The laminated facing has high corrosion resistance, passing tests at 125° F at 95% relative humidity for 30 days and, when immersed in water at 73° F for 90 days, no delamination or cracking occurs.

With respect to the thin and flexible laminated facing, the metallic film can have a thickness range of about 0.7 to 2 mils and it is preferably about 1 mil in thickness. While the metallic film can comprise almost any metal, it is preferably an aluminum film.

The glass fiber scrim of the laminated facing is preferably formed of monofilament glass fiber yarns having a size within the range of 37.5 to 225 yarn size. A yarn size of 75 is particularly advantageous for this invention. The yarns or fibers of the glass fiber scrim may be arranged in any desired scrim pattern and the spacing of the fibers may be within the range of 4 to 15 fibers per lineal inch. As specifically disclosed herein the scrim includes first fibers arranged in one direction and other fibers arranged in angular relation with respect thereto, and particularly advantageously the spacing of the first fibers is substantially 10 to the lineal inch while the spacing of the other fibers is substantially 6 to the lineal inch.

The synthetic plastic film of the laminated facing may be formed from various synthetic plastic materials but advantageously it comprises a polyvinyl chloride film. The thickness of the synthetic plastic film may be within the range of about 2 to 6 mils but preferably it is about 2 mils in thickness.

The adhesive for securing together the metallic film, the glass fiber scrim and the synthetic plastic film is preferably a hot melt adhesive which is capable of bonding the same together and which is initially applied to the scrim so that, when the metallic film, the glass fiber scrim and the synthetic plastic film are overlayed, heated and pressed together, the hot melt adhesive bonds the glass fiber scrim between and to the metallic film and the synthetic plastic film and flows into the spaces of the glass fiber scrim to bond together the metallic film and the synthetic plastic film within such spaces. The hot melt adhesive is a product of Staufer Chemical Co.

The adhesive for securing the laminated facing to the fabricated panel is essentially a water based emulsion adhesive, which is fire retardent, which works on the metallic film of the laminated facing and which is capable of bonding the metallic film to the fabricated panel, as for example, adhesive No. 40-01-21-20 of National Starch Chemical Co. The adhesive is preferably roller coated onto the metallic film of the laminated facing before it is applied to the fabricated panel and pressed thereagainst. As a result, the laminated facing is most effectively bonded to the fabricated panel at those areas thereof having the glass fibers of the scrim and the protuberances in the metallic film at the openings in the scrim, and least effectively bonded at those areas having the depressions in the metallic film at the openings in the scrim. Such bonding provides maximum control of the laminated facing and the fabricated panel by the high strength glass fiber scrim and assists greatly in affording the advantages of this invention.

As expressed above, the fabricated panels may be fabricated boards which are conventional in the industry, as for example, glass fiber reinforced gypsum boards, wet felted mineral boards, mineral fiber boards including glass fiber boards, rock or slag wool boards, or the like.

Where glass fiber reinforced gypsum boards or wet felted mineral boards are utilized as the fabricated panels in this invention, the former having a density of about 40 to 45 pounds per cubic foot has a thickness range of ⅜ to ⅝ inch and preferably a thickness of about ½ inch, and the latter having a density of about 20 pounds per cubic foot has a thickness range of ½ to ¾ inch and preferably a thickness of about ⅝ inch. The unitary structural panels of this invention, utilizing such fabricated panels, have substantially no acoustical properties, and to provide them with sound absorption characteristics, they may be provided with holes or perforations extending through the laminated facing into the fabricated panel for sound absorbing acoustical purposes. For example, the perforated unitary structural panel utilizing the fabricated wet felted mineral panel has a sound absorption (NCR) of substantially 0.65.

Where glass fiber boards are utilized as the fabricated panels in this invention, they have a thickness in the range of ¾ to 3 inch and preferably a thickness of about 1 inch. The glass fiber boards may have a density within the range of 3 to 12 pounds per cubic foot. Where rock or slag wool boards are utilized, they have a density in the range of 4 to 12 pounds per cubic foot, and they have a thickness in the range of ½ to 2 inches and preferably a thickness of about ⅝ inch for the 8–12 pound density boards and a thickness of about 1 inch for the 4 to 8 pound density boards. Where the density of the glass fiber boards is in the range of 3 to 6 pounds and of the rock or slag wool boards is in the range of 4 to 8 pounds, the unitary structural panel has good acoustical properties without perforation, the relatively thin and flexible laminated facing acting as a diaphragm against the fabricated panel for sound absorbing purposes. Where the density of the glass fiber board is in the range of 6 to 12 pounds and the density of the rock or slag wool boards is in the range of 8 to 12 pounds, the unitary structural panel may be provided with holes or perforations extending through the laminated facing into the fabricated panel for sound absorbing acoustical purposes. For example, the upperforated unitary structural panel with the lower density mineral fiber boards has a sound absorption (NCR) of substantially 0.60 while the perforated one with the higher density mineral fiber boards has a sound absorption (NCR) of substantially 0.80.

Further objects of this invention reside in the details of construction of the unitary structural panel and in the cooperative relationships between the component parts thereof.

Other objects and advantages of this invention will become apparent to those skilled in the art upon reference to the accompanying specificatin, claims and drawings in which:

Figure 2:
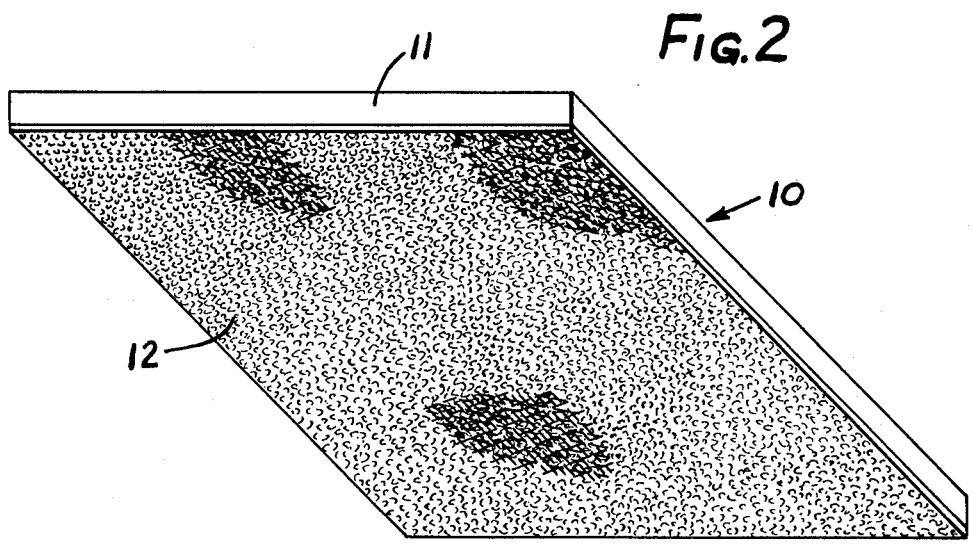
FIG. 2 is a semi-isometric view of a unitary structural panel of the invention having portions of the facing thereof showing in more detail the appearance thereof.

Referring first to FIG. 2, the unitary structural panel of this invention is generally designated at 10 and it includes a relatively thick fabricated panel 11, which of itself may be subject to sagging or warping or impact damage or fire damage or soil damage, and a relatively thin and flexible laminated facing 12 adhesively secured to the fabricated panel 11.

Figure 1:
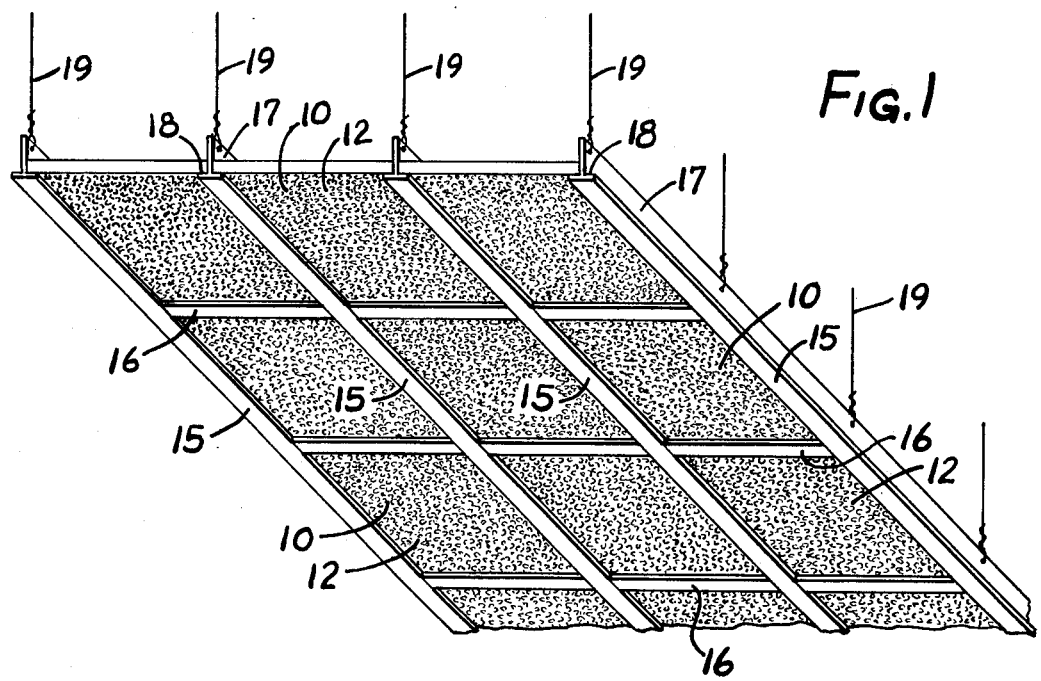
FIG. 1 is a semi-isometric view of a suspension type ceiling having the unitary structural panels of this invention incorporated therein.

In FIG. 1 a plurality of the unitary structural panels 10 are shown to be supported in a suspended ceiling having a plurality of T-shaped rails 15 and a plurality of cross rails 16 for edge supporting the unitary structural panels. The T-shaped rails 15 include vertical portions 17 and transverse legs 18 which are suitably supported as indicated at 19 from the permanent ceiling. The transverse rails 16 may be similarly constructed. The unitary structural panels 10 rest upon the transverse legs 18 of the rails 15 and on the rails 16 between the vertical portions 17 of the rails. Thus, the unitary structural panels are edge supported in the suspended ceiling structure and may be readily removed and inserted.

It is extremely desirable and necessary that the unitary panels 10 have sufficient dimensional stability and structural strength to be edge supported as a unit without sagging or warping, a high impact resistance, a high fire rating and easy washability and toward this end the unitary structural panel 10 of this invention includes a particular relatively thin and flexible laminated facing 12 adhesively secured to the relatively thick fabricated panel 11.

Figure 3:
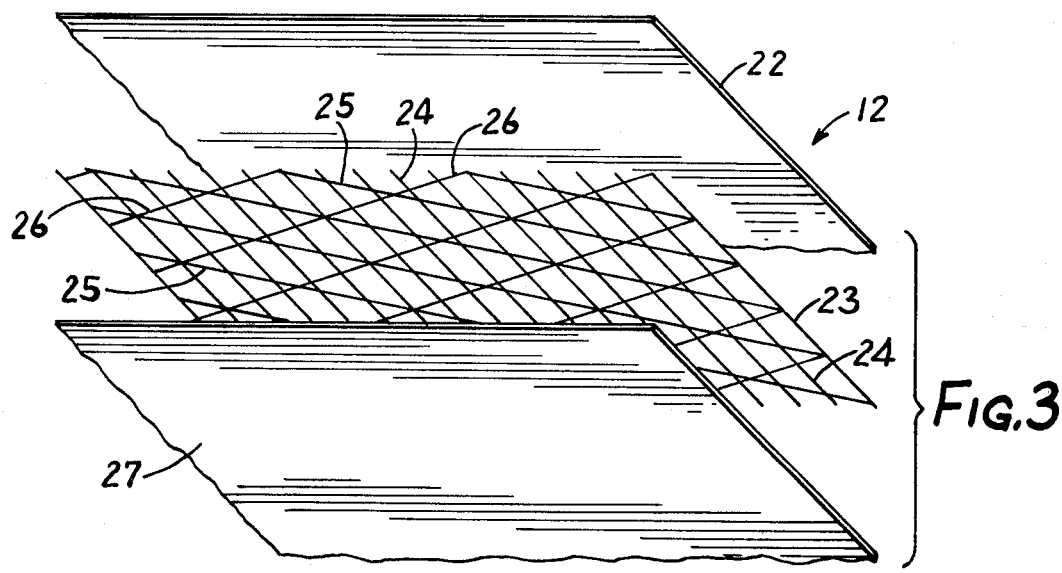
FIG. 3 is an enlarged exploded semi-isometric view of a portion of the relatively thin and flexible laminated facing including the metallic film, the glass fiber scrim andthe synthetic plastic film before they are adhesively secured together.

As shown more clearly in the enlarged view in FIG. 3, the relatively thin and flexible laminated facing 12 includes a thin metallic film 22 preferably made of aluminum, a glass fiber scrim 23 formed of monofilament glass fibers 24, 25 and 26. The monofilament glass fibers of the glass fiber scrim 23 may be arranged in any desired pattern, such as, rectangular or the like, but preferably, as illustrated in FIG. 3, the glass fibers 24 extend in parallel relationship in one direction while the glass fibers 25 and 26 are arranged angularly with respect to the glass fibers 24. Preferably, the spacing between the glass fibers 24 is less than the spacings between the glass fibers 25 and the glass fibers 26. The glass fibers 24, 25 and 26 of the glass fibers scrim 23 are coated with a hot melt adhesive. The laminated facing 12 also includes a thin synthetic plastic film 27 which is preferably a film of polyvinyl chloride containing a pigment, such as a white titanium based pigment, to make the film substantially opaque and to provide maximum light reflection.

The metallic film 22, the glass fiber scrim 23 and the synthetic plastic film 27 are overlaid and pressed together and heated for forming the relatively thin and flexible laminated facing 12. When this occurs, the hot melt adhesive on the glass fibers 24, 25 and 26 is heated and melted to bond the glass fiber scrim 23 between and to the metallic film 22 and the synthetic plastic film 27. The heated and melted hot melt adhesive also extends into the openings between the glass fibers 24, 25 and 26 so that the metallic film 22 is also bonded to the synthetic plastic film 27 within the openings in the glass fiber scrim 23.

Figure 4:
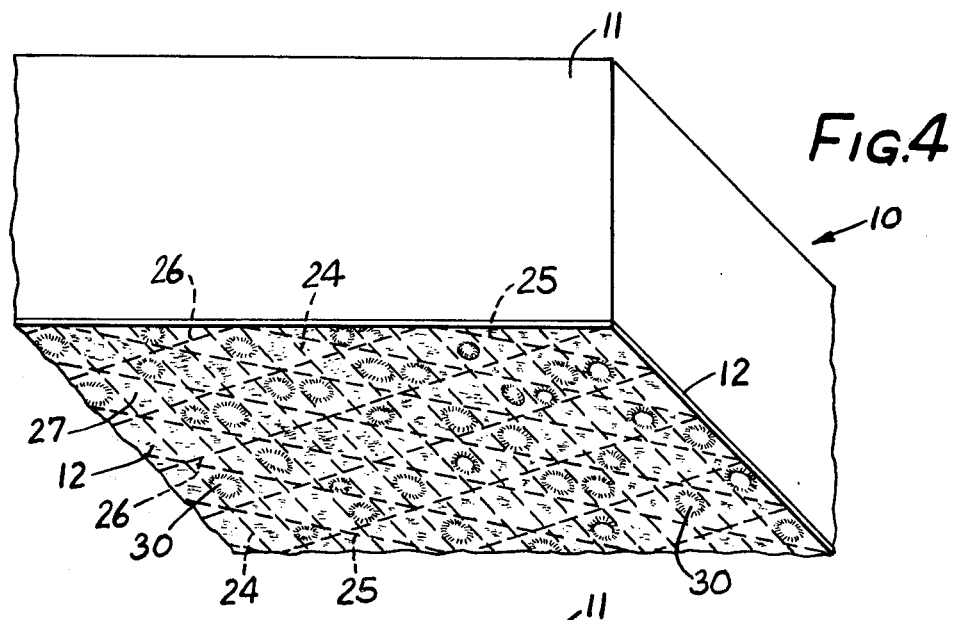
FIG. 4 is an enlarged semi-isometric view of a portion of the unitary structural panel illustrating the relatively thin and flexible laminated facing adhesively secured to the fabricated panel.
Figure 5:
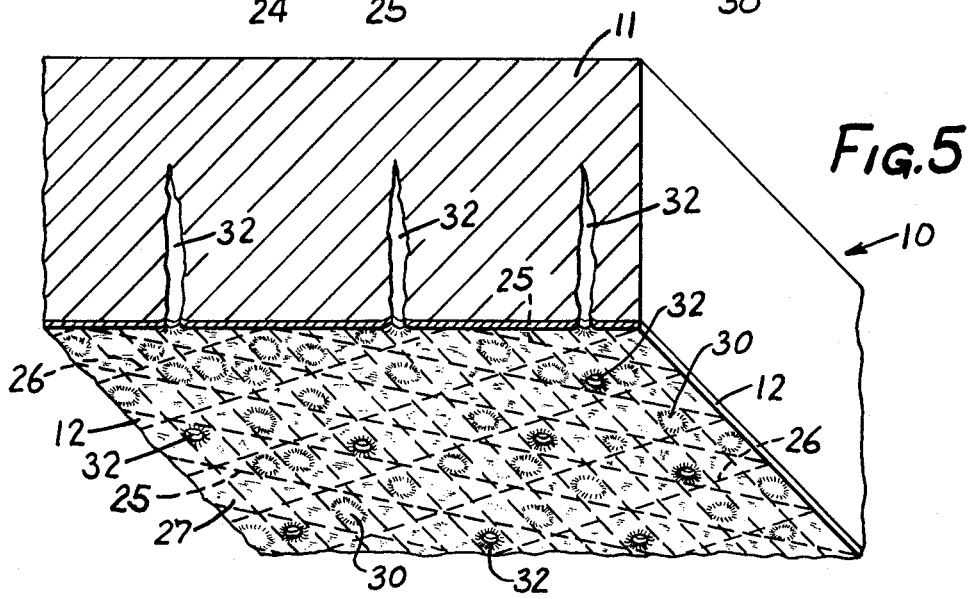
FIG. 5 is a view similar to FIG. 4 but illustrating perforations extending through the laminated facing into the fabricated panel.

The glass fiber scrim 23, including its glass fibers 24, 25 and 26, is arranged in substantially a flat plane and the metallic film 22 and synthetic plastic film 27, where they are bonded together within the openings of the glass fiber scrim, deviate from their respective planes to form protuberances and depressions 30 therein, as illustrated in FIGS. 4 and 5. The scrim 23 and the protuberances and depressions 30 in the exposed synthetic plastic film provide the laminating facing 12 with a textured and pleasingly ornamental appearance. The scrim 23 and the protuberances and depressions 30 in the metallic film provide the laminated facing 12 with an uneven surface where it is to be bonded to the fabricated panel. The laminated facing 12 so formed is thin and flexible and the glass fiber scrim 23 having high tensile strength provides a substantial reinforcing for the laminated facing 12 and for the fabricated panel 11 to which it is to be bonded.

Thereafter, the laminated facing 12 is adhesively secured to the relatively thick fabricated panel 11, as illustrated in FIGS. 2 and 4, by a fire retardent adhesive which is capable of working on the metallic film 22 and of bonding the metallic film to the fabricated panel 11. The adhesive is preferably roller coated onto the metallic film 22 of the laminated facing 12 before it is applied to the fabricated panel 11 and pressed thereagainst. As a result, the laminated facing 12 is most effectively bonded to the fabricated panel 11 at those areas thereof having the glass fibers 24, 25 and 26 of the scrim 23 an the protuberances 30 in the metallic film 22 at the openings in the scrim 23, and least effectively bonded at those areas having the depressions 30 in the metallic film 22 at the openings in the scrim 23. Such bonding provides maximum control of the laminated facing 12 and the fabricated panel 11 by the high strength glass fiber scrim 23 and assists greatly in affording the advantages of this invention.

As expressed above, the fabricated panels 11 may be fabricated boards which are conventional and available in the industry, as for example, glass fiber reinforced gypsum boards which include gypsum rock, chopped glass fiber stands and a starch binder, wet felted mineral boards which include chopped mineral fibers, such as rock wool, a clay, perlite and cellulose fiber mixture and a starch binder, and mineral fiber boards comprising glass fiber boards which include glass fibers and a modified phenolic binder and rock or slag wool boards which include rock or slag wool fibers and a modified phenolic binder.

Acoustical sound absorbing characteristics may be produced in the unitary structural panels 10, which use fabricated panels 11 of wet felted mineral boards or of mineral fiber boards including glass fiber boards having a density of about 6 to 12 pounds and rock or slag wool boards having a density of about 8 to 12 pounds, by providing them with holes or perforations 32, as illustrated in FIG. 5, extending through the laminated facing 12 into the fabricated panel. These holes or perforations 32 may be randomly arranged and may be of varying diameters, and they may be formed by a suitable punching or perforating process.

While for purposes of illustration several forms of this invention have been disclosed herein, other forms thereof may become apparent to those skilled in the art upon reference to this disclosure and, accordingly, this invention is to be limited only by the scope of the appended claims.

I claim:

1. A unitary structural acoustical panel for ceiling or wall installations which has large area dimensions, a dimensional stability and structural strength to be edge supported as a unit without sagging or warping, a high impact resistance, a high fire rating and easy washability, comprising in combination a relatively thick fabricated panel, which of itself may be subject to sagging or warping or impact damage or fire damage or soil damage, and a relatively thin and flexible laminated facing for said fabricated panel including a thin and flexible metallic film, a thin and flexible glass fiber scrim and a thin and flexible synthetic plastic film adhesively secured together with the scrim between and bonded to the metallic film and the synthetic plastic film and with the metallic film bonded to the synthetic plastic film within the openings in the scrim, said relatively thin and flexible laminated facing being adhesively secured to said fabricated panel, which of itself may be subject to sagging or warping or fire damage or impact fire damage or soil damage, with the metallic film thereof bonded to a face of the fabricated panel and with the synthetic plastic film thereof exposed to provide, in combination, the unitary structural acoustical panel which has large area dimensions, a dimensional stability and structural strength to be edge supported as a unit without sagging or warping, a high impact resistance, a high fire rating and easy washability.

2. A unitary structural panel as defined in claim 1 wherein the glass fiber scrim is arranged in substantially a flat plane, and the metallic film and synthetic plastic film, where they are bonded together within the openings of the glass fiber scrim, deviating from their respective planes to form protuberances and depressions therein.

3. A unitary structural panel as defined in claim 2 wherein the scrim and the protuberances and depressions in the exposed synthetic plastic film provide the laminated facing with a textured appearance.

4. A unitary structural panel as defined in claim 2 wherein the scrim and the protuberances and depressions in the metallic film provide the laminated facing with an uneven surface where it is bonded to the fabricated panel.

5. A unitary structure panel as defined in claim 1 wherein the metallic film is aluminum.

6. A unitary structural panel as defined in claim 1 wherein the metallic film has a thickness in the range of 0.7 to 2 mils.

7. A unitary structural panel as defined in claim 6 wherein the metallic film has a thickness of substantially 1 mil.

8. A unitary structural panel as defined in claim 1 wherein the glass fiber scrim comprises monofilament glass fibers.

9. A unitary structural panel as defined in claim 8 wherein the size of the monofilament glass fibers is within the range 37.5 to 225 yarn size.

10. A unitary structural panel as defined in claim 9 wherein the size of the monofilament glass fibers is substantially 75 yarn size.

11. A unitary structural panel as defined in claim 1 wherein the spacing of the fibers in the glass fiber scrim are within the range of 4 to 15 fibers per lineal inch.

12. A unitary structural panel as defined in claim 11 wherein the spacing of the fibers in the glass fiber scrim are substantially 10 per lineal inch for certain of the fibers and 6 per lineal inch for others of the fibers.

13. A unitary structural panel as defined in claim 1 wherein the synthetic plastic film is polyvinyl chloride.

14. A unitary structural panel as defined in claim 1 wherein the synthetic plastic film has a thickness in the range of 2 to 6 mils.

15. A unitary structural panel as defined in claim 14 wherein the thickness of the synthetic plastic film is substantially 2 mils.

16. A unitary structural panel as defined in claim 1 wherein the metallic film, the glass fiber scrim and the synthetic plastic film are adhesively secured together by a hot melt adhesive.

17. A unitary structural panel as defined in claim 1 wherein the laminated facing is adhesively secured to the fabricated panel by a fire retardent adhesive which is capable of working on the metallic film of the laminated facing and of bonding the metallic film to the fabricated panel.

18. A unitary structural panel as defined in claim 1 wherein the unitary structural panel is provided with holes extending through the laminated facing into the fabricated panel for sound absorbing acoustical purposes.

19. A unitary structure panel as defined in claim 1 wherein the fabricated panel comprises a glass fiber reinforced gypsum board.

20. A unitary structural panel as defined in claim 19 wherein the glass fiber reinforced gypsum board has a thickness in the range of ⅜ to ⅝ inch.

21. A unitary structural panel as defined in claim 20 wherein the glass fiber reinforced gypsum board has a thickness of substantially ½ inch.

22. A unitary structural panel as defined in claim 1 wherein the fabricated panel comprises a wet felted mineral board.

23. A unitary structural panel as defined in claim 22 wherein the wet felted mineral board has a thickness in the range of ½ to ¾ inch.

24. A unitary structural panel as defined in claim 23 wherein the wet felted mineral board has a thickness of substantially ⅝ inch.

25. A unitary structural panel as defined in claim 22 wherein the unitary structural panel is provided with holes extending through the laminated facing into the fabricated panel for sound absorbing acoustical purposes.

26. A unitary structural panel as defined in claim 1 wherein the fabricated panel comprises a mineral fiber board.

27. A unitary structural panel as defined in claim 26 wherein the mineral fiber board is a glass fiber board and has a thickness in the range of ¾ to 3 inch.

28. A unitary structural panel as defined in claim 27 wherein the glass fiber board has a thickness of substantially 1 inch.

29. A unitary structural panel as defined in claim 26 wherein the mineral fiber board is a glass fiber board and has a density in the range of 3 to 6 pounds.

30. A unitary structure panel as defined in claim 29 wherein the relatively thin and flexible laminated facing acts as a diaphragm against the glass fiber board for sound absorbing acoustical purposes.

31. A unitary structural panel as defined in claim 26 wherein the mineral fiber board is a glass fiber board and has a density in the range of 6 to 12 pounds.

32. A unitary structural panel as defined in claim 31 wherein the unitary structural panel is provided with holes extending through the laminated facing into the fabricated panel for sound absorbing acoustical purposes.

33. A unitary structural panel as defined in claim 26 wherein the mineral fiber board is a rock or slag wool board and has a thickness in the range of ½ to 2 inch.

34. A unitary structural panel as defined in claim 33 wherein the rock or slag wool board has a density in the range of 4 to 8 pounds and a thickness of about 1 inch.

35. A unitary structural panel as defined in claim 34 wherein the relatively thin and flexible laminated facing acts as a diaphragm against the rock or slag wool board for sound absorbing acoustical purposes.

36. A unitary structural panel as defined in claim 33 wherein the rock or slag wool board has a density in the range of 8 to 12 pounds and a thickness of about ½ inch.

37. A unitary structural panel as defined in claim 36 wherein the unitary structural panel is provided with holes extending through the laminated facing into the fabricated panel for sound absorbing acoustical purposes.

38. A unitary structural panel as defined in claim 1 wherein the synthetic plastic film contains a pigment and is substantially opaque for appearance purposes and maximum light reflection.

* * * * *